US012789315B2

(12) United States Patent
Nakamura

(10) Patent No.: US 12,789,315 B2
(45) Date of Patent: Nov. 10, 2026

(54) HOLDING JIG, MANUFACTURING METHOD OF HOLDING JIG, AND GRINDING METHOD OF WORKPIECE

(71) Applicant: DISCO CORPORATION, Tokyo (JP)

(72) Inventor: Masaru Nakamura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 399 days.

(21) Appl. No.: 18/493,128

(22) Filed: Oct. 24, 2023

(65) Prior Publication Data

US 2024/0149392 A1 May 9, 2024

(30) Foreign Application Priority Data

Nov. 4, 2022 (JP) ................................ 2022-177541

(51) Int. Cl.

*B24B 41/06* (2012.01)
*B23K 26/53* (2014.01)
*B24B 7/22* (2006.01)
*B24B 41/00* (2006.01)

(52) U.S. Cl.

CPC ............ *B24B 41/068* (2013.01); *B23K 26/53* (2015.10); *B24B 7/228* (2013.01); *B24B 41/005* (2013.01)

(58) Field of Classification Search

CPC ..... B24B 41/068; B24B 7/228; H01L 21/304; H01L 21/6836; H01L 21/6834; B23K 26/53

See application file for complete search history.

(56) References Cited

U.S. PATENT DOCUMENTS 8,167,687 B2 * 5/2012 Nakamura .......... H01L 21/6836 451/364
11,583,962 B2 * 2/2023 Nakamura ........... B23K 26/364

FOREIGN PATENT DOCUMENTS

| | | | | |
|---|---|---|---|---|
| JP | 2001196448 | A | | 7/2001 |
| JP | 2004356357 | A | | 12/2004 |
| JP | 2011103456 | A | | 5/2011 |
| JP | 2015229206 | A | * | 12/2015 |
| JP | 2017028157 | A | * | 2/2017 |
| JP | 2019111634 | A | | 7/2019 |

OTHER PUBLICATIONS

Office Action issued in counterpart Japanese patent application No. 2022-177541, dated Apr. 21, 2026.

* cited by examiner

*Primary Examiner* — Justin D Seabe

(74) *Attorney, Agent, or Firm* — Greer, Burns & Crain, Ltd.

(57) ABSTRACT

A holding jig has a plate shape and is interposed between a workpiece with a circular plate shape and a chuck table when the workpiece is held by the chuck table in a grinding apparatus including the chuck table and a grinding unit including a grinding wheel. The holding jig has a first surface, a second surface on the opposite side of the first surface, and an outer circumferential surface that connects the first surface and the second surface. An altered layer that reaches a central region of the second surface from a central region of the first surface is formed. The material of the main component of the holding jig is the same as the material of the main component of the workpiece.

18 Claims, 11 Drawing Sheets

HOLDING JIG, MANUFACTURING METHOD OF HOLDING JIG, AND GRINDING METHOD OF WORKPIECE

BACKGROUND OF THE INVENTION

Field of the Invention

The present invention relates to a holding jig that is used when a workpiece with a circular plate shape is held by a chuck table, a manufacturing method of the holding jig, and a grinding method of a workpiece in which the workpiece is ground with use of this holding jig.

Description of the Related Art

There are increasing opportunities to thinly process a circular plate-shaped wafer on which a plurality of devices typified by integrated circuits are disposed on a front surface, in order to implement small-size, light-weight device chips. For example, the front surface side of the wafer is held by a chuck table, and a tool called the grinding wheel and the chuck table are both rotated, so that the grinding wheel is pressed against the back surface of the wafer while liquid such as purified water is supplied. This can grind this wafer to make the wafer thin.

Incidentally, to make the thickness of a plurality of device chips that become products uniform, the wafer needs to be ground with sufficiently high accuracy to cause the thickness of the wafer that has been ground to become substantially constant in the whole of the wafer. For this challenge, in recent years, there has been proposed a grinding method in which a workpiece is ground while being held by a chuck table with the interposition of a holding jig (substrate) of the same material as the workpiece (for example, refer to Japanese Patent Laid-open No. 2019-111634). When the substrate of the same material as the workpiece is held by the chuck table and is ground, the shape of the ground surface of the substrate that has been ground becomes substantially equal to the shape of the ground surface of the workpiece that has been ground in the case in which the workpiece is directly held by the chuck table and is ground under the same condition. Thus, when the workpiece is brought into close contact with the ground surface of the substrate that has been ground and the workpiece is ground while being held by the chuck table with the interposition of this substrate, the shape of the ground surface of the workpiece that has been ground can be made substantially equal to the shape of the surface on the opposite side of the ground surface (surface brought into close contact with the ground surface of the substrate).

As described above, according to the above-described grinding method, the distance between the ground surface of the workpiece and the surface on the opposite side of the ground surface can be made substantially constant in the whole of the workpiece. That is, the thickness of the workpiece can be made substantially constant in the whole of the workpiece. In the substrate used as the holding jig, a plurality of holes that penetrate the substrate in the thickness direction are made to allow a suction force of the chuck table to act on the workpiece. Moreover, as a method for simply forming the through-holes in the substrate, there is known a method in which linear grooves that intersect each other are formed on each of the front surface side and the back surface side of a substrate and through-holes are made at positions at which both grooves intersect by making the sum of the depths of both grooves equal to or larger than the thickness of the substrate (refer to Japanese Patent Laid-open No. 2004-356357). The holding jig can be formed also by this method.

SUMMARY OF THE INVENTION

The grooves are exposed in the upper surface of the holding jig that supports the workpiece on the chuck table. Thus, the workpiece is supported by the holding jig around the grooves whereas the workpiece is not supported and becomes floating at positions where the workpiece overlaps with the grooves. When a grinding wheel is lowered in this state and grinding abrasive stones disposed on the lower surface side of the grinding wheel are pressed against the upper surface of the workpiece to grind the workpiece, the workpiece is partly pushed into the grooves and becomes slightly protrusive. In this case, minute protruding parts that are traces of the grooves of the holding jig are left in the supported surface on the opposite side of the ground surface in the workpiece.

Hence, an object of the present invention is to provide a holding jig that prevents generation of minute protruding parts in a supported surface of a workpiece while transmitting a suction force to the workpiece, a manufacturing method of the holding jig, and a grinding method of a workpiece in which the workpiece is ground with use of this holding jig.

In accordance with an aspect of the present invention, there is provided a holding jig that has a plate shape and is interposed between a workpiece and a chuck table when the workpiece is held by the chuck table. The holding jig includes a first surface, a second surface on the opposite side of the first surface, and an outer circumferential surface that connects the first surface and the second surface. An altered layer that reaches a central region of the second surface from a central region of the first surface is formed.

In accordance with another aspect of the present invention, there is provided a holding jig that has a plate shape and is interposed between a workpiece with a circular plate shape and a chuck table when the workpiece is held by the chuck table in a grinding apparatus including the chuck table, a grinding unit including a grinding wheel with a circular plate shape or a circular annular shape, and a grinding feed unit that causes the chuck table and the grinding unit to relatively approach or separate from each other. The holding jig includes a first surface, a second surface on the opposite side of the first surface, and an outer circumferential surface that connects the first surface and the second surface. An altered layer that reaches a central region of the second surface from a central region of the first surface is formed. A material of a main component of the holding jig is the same as a material of a main component of the workpiece.

Preferably, the altered layer has one of or both a part formed into a straight line shape along the first surface and a part formed into a circular shape along the first surface.

In accordance with a further aspect of the present invention, there is provided a manufacturing method of a holding jig that has a plate shape and is interposed between a workpiece and a chuck table when the workpiece is held by the chuck table, the holding jig including a first surface, a second surface on the opposite side of the first surface, and an outer circumferential surface that connects the first surface and the second surface, and an altered layer that reaches a central region of the second surface from a central region of the first surface being formed. The manufacturing method includes a preparation step of preparing a substrate and a laser processing step of manufacturing the holding jig by focusing a laser beam having a wavelength component transmitted through the substrate on the substrate and forming the altered layer in the substrate.

In accordance with a still further aspect of the present invention, there is provided a grinding method of a workpiece in which the workpiece is ground with use of a holding jig that has a plate shape and is interposed between a workpiece with a circular plate shape and a chuck table when the workpiece is held by the chuck table in a grinding apparatus including the chuck table, a grinding unit including a grinding wheel with a circular plate shape or a circular annular shape, and a grinding feed unit that causes the chuck table and the grinding unit to relatively approach or separate from each other, the holding jig including a first surface, a second surface on the opposite side of the first surface, and an outer circumferential surface that connects the first surface and the second surface, an altered layer that reaches a central region of the second surface from a central region of the first surface being formed, and a material of a main component of the holding jig being the same as a material of a main component of the workpiece. The grinding method includes a jig support step of supporting the holding jig by the chuck table by bringing the side of the second surface of the holding jig into contact with the chuck table and a workpiece holding step of sucking and holding the workpiece by the chuck table by placing the workpiece on the first surface of the holding jig and sucking the workpiece by the chuck table through the holding jig. The grinding method includes also a workpiece grinding step of grinding the workpiece held by the chuck table with the interposition of the holding jig by the grinding wheel through starting rotation of the chuck table around a table rotation axis and rotation of the grinding wheel around a wheel rotation axis and starting grinding feed in which the chuck table and the grinding unit move to relatively approach each other by actuation of the grinding feed unit.

Preferably, the grinding method of a workpiece further includes a jig grinding step of grinding the holding jig by the grinding wheel after the jig support step but before the workpiece holding step.

In one aspect of the present invention, the altered layer that reaches the second surface from the first surface is formed in the holding jig. This altered layer has a slight gap and can function as a suction path that transmits a negative pressure from the first surface to the second surface. Moreover, the width of the altered layer exposed in the first surface and the second surface is extremely small. Thus, when the workpiece is sucked and held by the chuck table with the interposition of the holding jig and the workpiece is ground, the workpiece almost does not sink into the altered layer. Accordingly, minute protruding parts are less liable to be generated in the supported surface of the workpiece.

Hence, according to the one aspect of the present invention, a holding jig that prevents generation of minute protruding parts in a supported surface of a workpiece while transmitting a suction force to the workpiece, a manufacturing method of the holding jig, and a grinding method of a workpiece in which the workpiece is ground with use of this holding jig are provided.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 6:
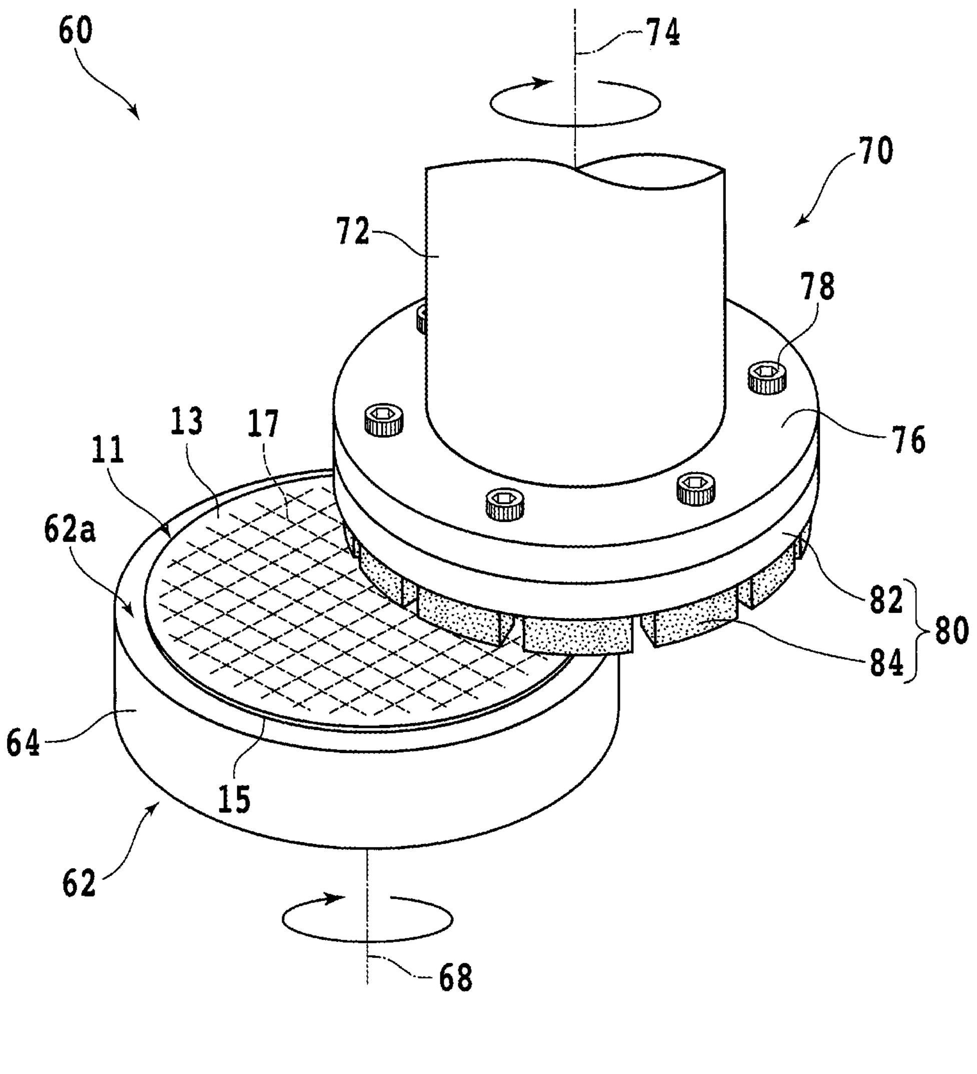
FIG. 6 is a perspective view schematically illustrating the state in which the holding jig is ground.

An embodiment according to one aspect of the present invention will be described with reference to the accompanying drawings. A holding jig according to the present embodiment is used mainly in a grinding apparatus. In FIG. 6, a grinding apparatus 60 in which a holding jig 11 is used is schematically illustrated. The grinding apparatus 60 includes a chuck table 62 that sucks and holds a workpiece and a grinding unit 70 including a grinding wheel 80 with a circular plate shape or a circular annular shape. Moreover, the grinding apparatus 60 includes a grinding feed unit (not illustrated) that causes the chuck table 62 and the grinding unit 70 to relatively approach or separate from each other. The holding jig 11 according to the present embodiment is used through being interposed between a workpiece with a circular plate shape and the chuck table 62 when the workpiece is held by the chuck table 62, for example.

Figure 1A:
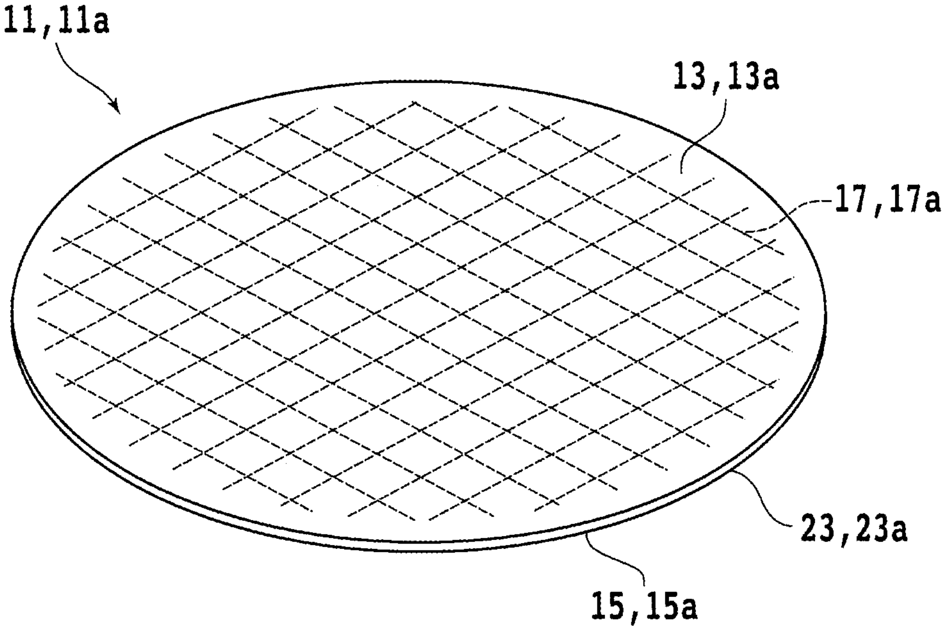
FIG. 1A is a perspective view schematically illustrating one example of a holding jig.
Figure 1B:
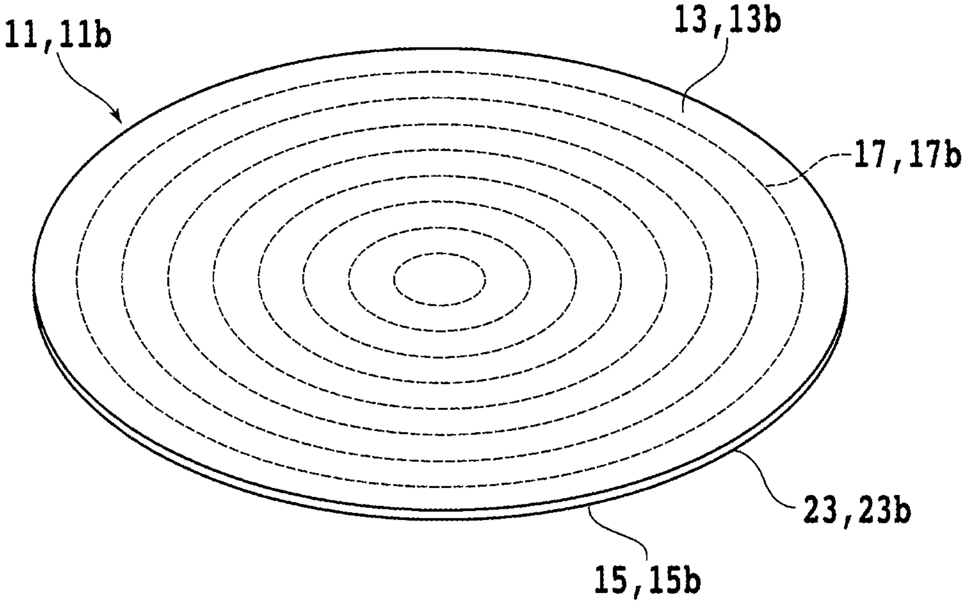
FIG. 1B is a perspective view schematically illustrating another example of the holding jig.
Figure 2:
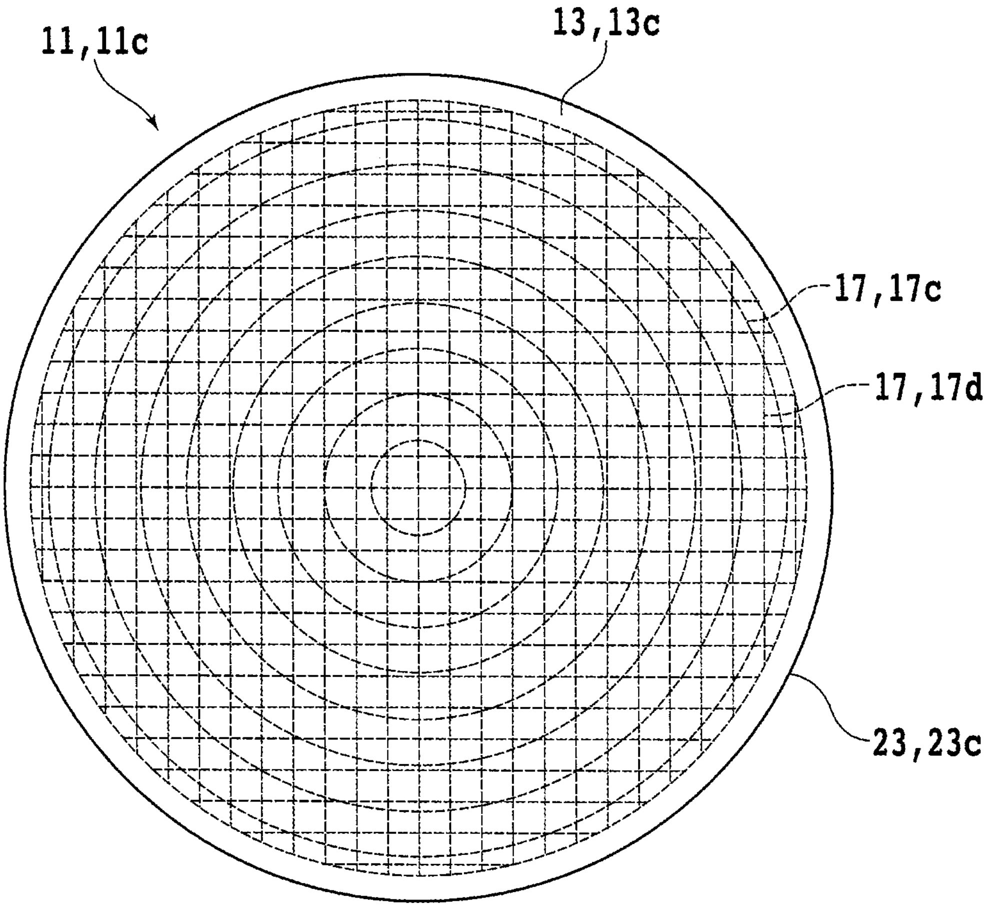
FIG. 2 is a plan view schematically illustrating still another example of the holding jig.

FIG. 1A is a perspective view schematically illustrating the holding jig 11 or 11*a* according to one example. FIG. 1B is a perspective view schematically illustrating the holding jig 11 or 11*b* according to another example. FIG. 2 is a plan view schematically illustrating the holding jig 11 or 11*c* according to still another example. In FIG. 1A, FIG. 1B, and FIG. 2, the respective elements that configure the holding jigs 11, 11*a*, 11*b*, and 11*c* are simplified for convenience of explanation. That is, the shape, size, quantity, arrangement, and so forth of the respective elements illustrated in the respective diagrams are merely one example for the purpose of explanation to the last and by no means impose any limitation on the holding jigs 11, 11*a*, 11*b*, and 11*c* according to the present embodiment at all.

For example, the holding jig 11 according to the present embodiment is used when a workpiece such as a semiconductor wafer is sucked and held by the chuck table 62 included in the grinding apparatus 60 in the grinding apparatus 60 that grinds the workpiece. More specifically, the holding jig 11 is placed on the chuck table 62, and the workpiece is placed on the holding jig 11. The holding jig 11 can transmit a negative pressure (suction force) along the upward-downward direction, and the chuck table 62 can suck and hold the workpiece through the holding jig 11.

As described later, the upper surface of the holding jig 11 is ground prior to the workpiece in the grinding apparatus 60. It is preferable that the holding jig 11 be equivalent to the workpiece in easiness of grinding in the grinding apparatus 60. Thus, it is preferable that, in the holding jig 11, the material that is the main component be the same as that of the workpiece to be ground by the grinding apparatus 60. For example, when grinding of a silicon wafer as the workpiece is scheduled in the grinding apparatus 60, it is preferable that a circular plate containing silicon (Si) as the main component be used as the holding jig 11, and it is more preferable that a silicon wafer be used. However, a material different from that of the workpiece may be used as the material of the holding jig 11. For the holding jig 11, for example, a crystalline semiconductor material such as Si or silicon carbide (SiC) may be used or an amorphous material such as glass may be used.

As illustrated in FIGS. 1A and 1B, the holding jig 11 is formed into a circular plate shape having a circular first surface 13, a circular second surface 15 on the opposite side of the first surface 13, and an outer circumferential surface 23 that connects the outer edge of the first surface 13 and the outer edge of the second surface 15. The holding jig 11 is used when a circular plate-shaped workpiece typified by a semiconductor wafer is to be held by the chuck table 62. Hence, it is preferable for the holding jig 11 to be configured to have a diameter equivalent to or larger than that of the target workpiece. However, if the diameter of the holding jig 11 becomes too large with respect to the diameter of the target workpiece, it becomes difficult to grind the holding jig 11 as with the target workpiece. Hence, it is desirable to decide the diameter of the holding jig 11 in such a manner as to cause the diameter of the holding jig 11 to be 1.00 to 1.15 times of the diameter of the target workpiece. The thickness of the holding jig 11 (distance between the first surface 13 and the second surface 15) is, for example, 0.2 to 5.0 mm and is typically 0.7 mm.

In the holding jig 11, an altered layer 17 that reaches a central region of the second surface 15 from a central region of the first surface 13 is formed. Here, the central region of each surface refers to a region that is not in contact with the outer circumferential surface 23 or a region separate from the outer circumferential surface 23 and is a region including the center of each surface. Although the altered layer 17 exposed in a surface is schematically illustrated by dashed lines in the respective diagrams, the shape of the altered layer 17 is not limited thereto. Natures and a forming method of the altered layer 17 will be described later. In the respective holding jigs 11 illustrated in FIG. 1A, FIG. 1B, and FIG. 2, mainly the shapes and the arrangements of the altered layer 17 are different from each other.

In the holding jig 11*a* illustrated in FIG. 1A, an altered layer 17*a* includes a plurality of parts having a straight line shape as the shape in a plane parallel to a first surface 13*a* and a second surface 15*a*. That is, the altered layer 17*a* includes a plurality of straight line-shaped parts that intersect each other. However, the altered layer 17*a* does not reach an outer circumferential surface 23*a*. Moreover, in the holding jig 11*b* illustrated in FIG. 1B, an altered layer 17*b* includes a plurality of parts having a circular shape as the shape in a plane parallel to a first surface 13*b* and a second surface 15*b*. That is, the altered layer 17*b* includes a plurality of circular parts different from each other in diameter. In addition, the center of each circular part is positioned to the center of the first surface 13*b* (second surface 15*b*). Moreover, the altered layer 17*b* does not reach an outer circumferential surface 23*b*. Further, in the holding jig 11*c* illustrated in FIG. 2, the altered layer 17 includes a combination of an altered layer 17*c* with a circular shape in a plane parallel to a first surface 13*c* and a second surface 15*c* and an altered layer 17*d* with a straight line shape in the same plane. Further, the altered layers 17*c* and 17*d* do not reach an outer circumferential surface 23*c* also in the holding jig 11*c* illustrated in FIG. 2. As described above, in the holding jig 11 according to the present embodiment, the altered layer 17 has one of or both the part formed into the straight line shape along the first surface 13 and the part formed into the circular shape along the first surface 13.

Figure 11A:
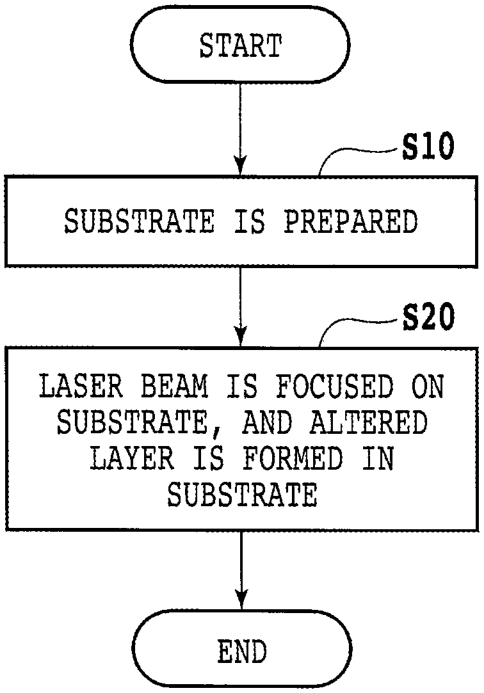
FIG. 11A is a flowchart illustrating the flow of the respective steps of a manufacturing method of the holding jig.

Next, a manufacturing method of the holding jig 11 according to the present embodiment will be described. FIG. 11A is a flowchart for explaining the flow of the respective steps of the manufacturing method of the holding jig 11 according to the present embodiment.

In the manufacturing method of the holding jig 11 according to the present embodiment, first, a preparation step S10 of preparing a substrate that serves as a raw material of the holding jig 11 is executed. In the preparation step S10, for example, a silicon wafer in which the main component is the same material as that of a workpiece held by the chuck table 62 (see FIG. 6 and so forth) with the interposition of the holding jig 11 manufactured is prepared as the substrate. However, the substrate to be prepared in the preparation step S10 is not limited thereto. In the preparation step S10, for example, the substrate may be prepared by reproducing a workpiece for which proper execution of any step has failed in the formation process of device chips and that has been excluded from the manufacturing steps of the device chips. For example, in the preparation step S10, when devices or the like have been formed on a surface of the workpiece, the substrate may be prepared by grinding this surface by the grinding apparatus 60 and removing the devices.

Figure 3:
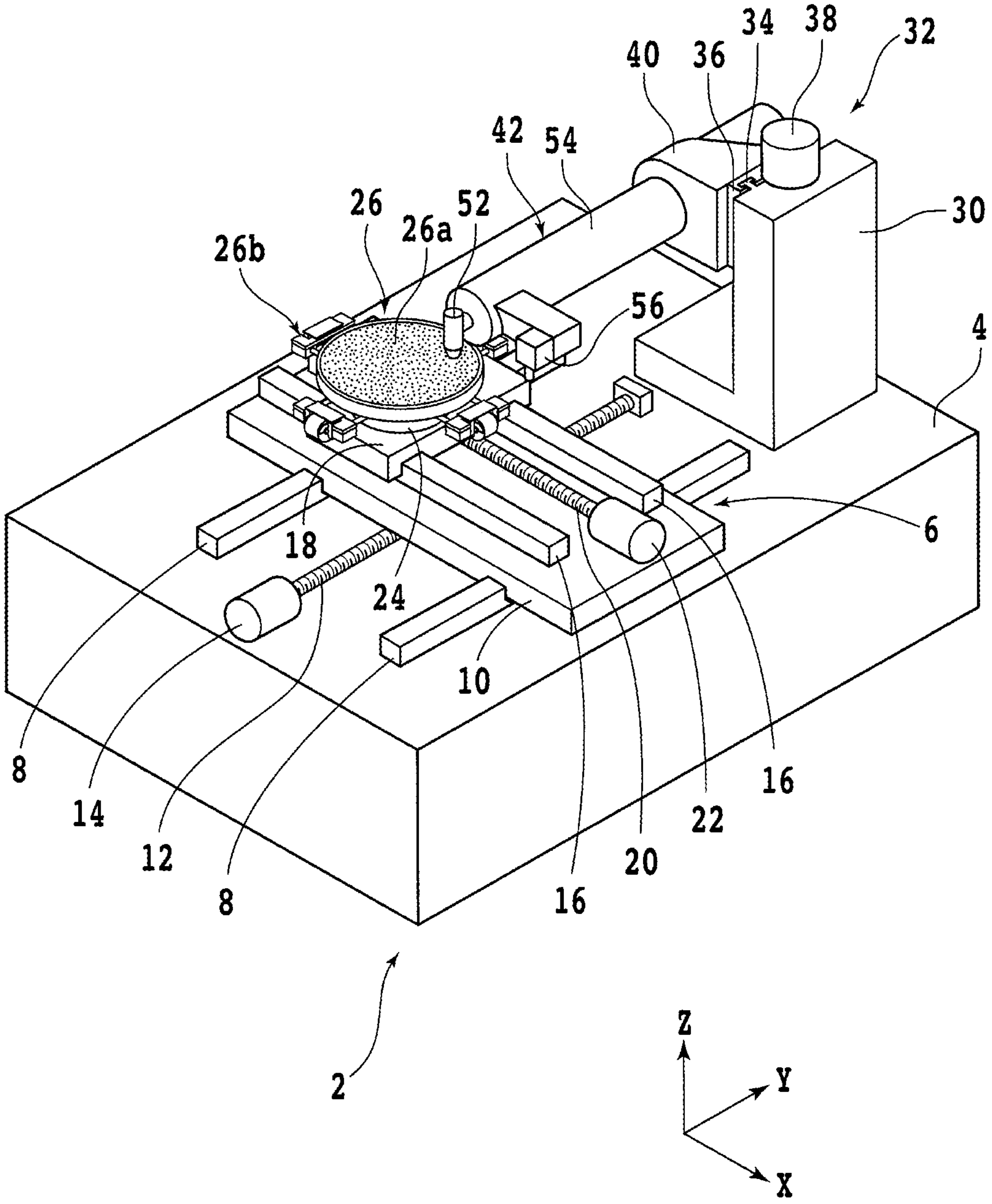
FIG. 3 is a perspective view schematically illustrating a laser processing apparatus.

In the manufacturing method of the holding jig 11 according to the present embodiment, next, a laser processing step S20 of manufacturing the holding jig 11 by focusing a laser beam having a wavelength component transmitted through the substrate on the substrate and forming the altered layer 17 in the substrate is executed. The laser processing of the substrate is executed by a laser processing apparatus. Next, a laser processing apparatus 2 will be described. FIG. 3 is a perspective view schematically illustrating the laser processing apparatus 2 used for the laser processing of the substrate. An X-axis direction and a Y-axis direction illustrated in FIG. 3 are directions orthogonal to each other in a horizontal plane. Moreover, a Z-axis direction is the direction orthogonal to each of the X-axis direction and the Y-axis direction (vertical direction).

The laser processing apparatus 2 has a base 4 that supports the respective constituent elements. An X-axis Y-axis movement mechanism 6 is disposed on the upper surface of the base 4. The X-axis Y-axis movement mechanism 6 has a pair of Y-axis guide rails 8 that are fixed to the upper surface of the base 4 and are disposed along the Y-axis direction. A Y-axis moving plate 10 is attached to the upper surface side of the pair of Y-axis guide rails 8 slidably along the pair of Y-axis guide rails 8. A ball screw is disposed on the lower surface side of the Y-axis moving plate 10. The ball screw has a nut part (not illustrated) fixed to the lower surface of the Y-axis moving plate 10. A screw shaft 12 is coupled to the nut part in such a manner as to be rotatable by balls (not illustrated). The screw shaft 12 is disposed along the Y-axis direction between the pair of Y-axis guide rails 8. A motor 14 for rotating the screw shaft 12 is coupled to one end part of the screw shaft 12. When the motor 14 is operated, the Y-axis moving plate 10 moves along the Y-axis direction. The pair of Y-axis guide rails 8, the Y-axis moving plate 10, the screw shaft 12, the nut part, the motor 14, and so forth configure a Y-axis movement mechanism.

A pair of X-axis guide rails 16 are fixed to the upper surface of the Y-axis moving plate 10. The pair of X-axis guide rails 16 are disposed along the X-axis direction. An X-axis moving plate 18 is attached to the upper surface side of the pair of X-axis guide rails 16 slidably along the pair of X-axis guide rails 16. A ball screw is disposed on the lower surface side of the X-axis moving plate 18. The ball screw has a nut part (not illustrated) fixed to the lower surface of the X-axis moving plate 18. A screw shaft 20 is coupled to the nut part in such a manner as to be rotatable by balls (not illustrated). The screw shaft 20 is disposed along the X-axis direction between the pair of X-axis guide rails 16. A motor 22 for rotating the screw shaft 20 is coupled to one end part of the screw shaft 20. When the motor 22 is operated, the X-axis moving plate 18 moves along the X-axis direction. The pair of X-axis guide rails 16, the X-axis moving plate 18, the screw shaft 20, the nut part, the motor 22, and so forth configure an X-axis movement mechanism. A circular columnar table base 24 is disposed on the upper surface side of the X-axis moving plate 18. The table base 24 has a rotational drive source (not illustrated) such as a motor.

A chuck table 26 with a circular plate shape is disposed on a top part of the table base 24. The rotational drive source can rotate the chuck table 26 in a predetermined angle range with a straight line that passes through the center of a holding surface 26*a* of the chuck table 26 and is parallel to the Z-axis direction being the rotation axis. The chuck table 26 has a circular plate-shaped frame body formed of a non-porous metal. A recessed part (not illustrated) with a circular plate shape is formed at a central part of the frame body. A circular plate-shaped porous plate formed of ceramic is fixed to this recessed part. A predetermined flow path (not illustrated) is formed in the frame body. A negative pressure is transmitted from a suction source (not illustrated) such as an ejector to the upper surface of the porous plate through the predetermined flow path.

The annular upper surface of the frame body and the circular upper surface of the porous plate are substantially flush with each other and function as the substantially flat holding surface 26*a* for sucking and holding the substrate. In the state in which the substrate is sucked and held by the holding surface 26*a*, the substrate can move along either of the X-axis and Y-axis directions by the X-axis Y-axis movement mechanism 6. At an outer circumferential part of the chuck table 26, a plurality of (in the present embodiment, four) clamp units 26*b* are disposed at substantially equal intervals along the circumferential direction of the chuck table 26. Each clamp unit 26*b* clamps a ring frame to be described later.

A support structure 30 is disposed on a predetermined region in the base 4 located on the rear side of the X-axis Y-axis movement mechanism 6. A Z-axis movement mechanism 32 is disposed on one side surface of the support structure 30 along the Y-Z plane. The Z-axis movement mechanism 32 has a pair of Z-axis guide rails 34. The pair of Z-axis guide rails 34 are fixed to the one side surface of the support structure 30 and are disposed along the Z-axis direction. A Z-axis moving plate 36 is attached to the pair of Z-axis guide rails 34 slidably along the pair of Z-axis guide rails 34. A ball screw (not illustrated) is disposed on the back surface side of the Z-axis moving plate 36. The ball screw has a nut part (not illustrated) fixed to the back surface of the Z-axis moving plate 36. A screw shaft (not illustrated) is coupled to the nut part in such a manner as to be rotatable by balls. The screw shaft is disposed along the Z-axis direction between the pair of Z-axis guide rails 34. A motor 38 for rotating the screw shaft is coupled to an upper end part of the screw shaft. When the motor 38 is operated, the Z-axis moving plate 36 moves along the Z-axis direction.

A support implement 40 is fixed to the front surface side of the Z-axis moving plate 36. The support implement 40 supports part of a laser beam irradiation unit 42. The laser beam irradiation unit 42 has a laser oscillator (not illustrated) fixed to the base 4. For example, the laser oscillator has Nd:$YVO_4$, Nd:YAG, or the like as a laser medium and emits a pulsed laser beam having such a wavelength as to be transmitted through the substrate (for example, 1342 nm, 1064 nm). The laser beam that has gone off from the laser oscillator travels on an optical path inside the laser beam irradiation unit 42 and is guided to an irradiation head 52. A collecting lens (not illustrated) that focuses the laser beam and so forth are housed in the irradiation head 52.

The irradiation head 52 is disposed to face the holding surface 26*a* at the time of laser processing, and the laser beam is emitted to the holding surface 26*a*. The irradiation head 52 is disposed at a front end part of a circular columnar housing 54 having a longitudinal part disposed along the Y-axis direction. Part of the rear end part side of the housing 54 is fixed by the support implement 40. Moreover, an imaging unit 56 is fixed to the side surface of the housing 54 located near the irradiation head 52, in such a manner as to be able to face the holding surface 26*a*. The irradiation head 52, the housing 54, the imaging unit 56, and so forth can integrally move along the Z-axis direction by the Z-axis movement mechanism 32.

For example, the imaging unit 56 is a visible light camera unit having an objective lens, a light source such as a light emitting diode (LED), and an imaging element such as a charge-coupled device (CCD) image sensor or a complementary metal-oxide-semiconductor (CMOS) image sensor. In the case of the visible light camera unit, for example a photodiode made of Si is used as the imaging element. The imaging unit 56 may be an infrared camera unit having a light source such as an LED and an imaging element.

Figure 4:
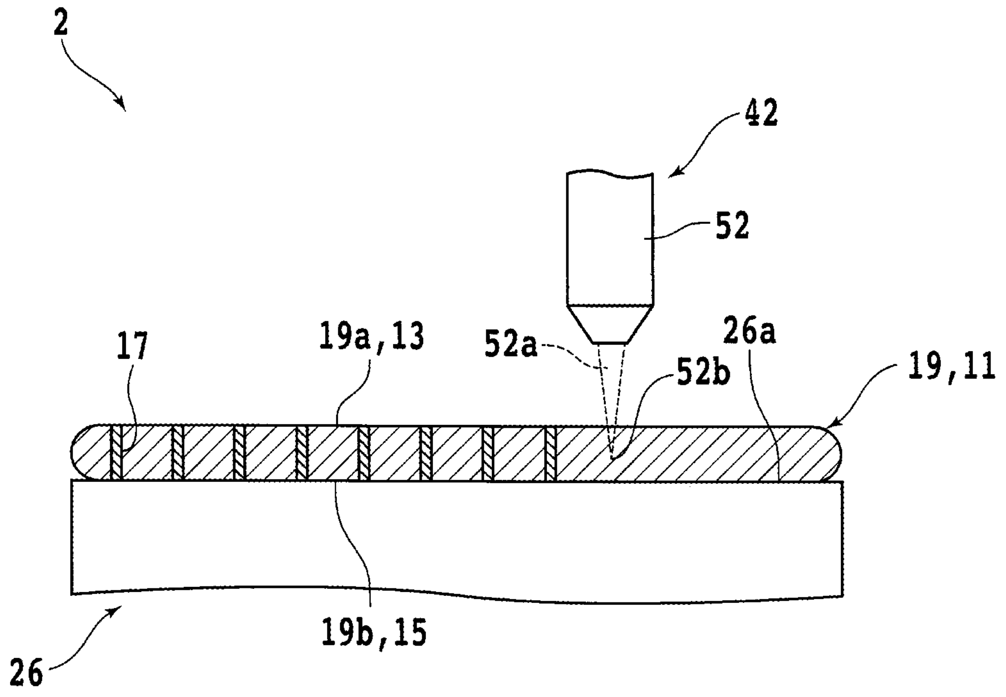
FIG. 4 is a sectional view schematically illustrating the state in which an altered layer is formed in a substrate to manufacture the holding jig.

FIG. 4 is a sectional view schematically illustrating a substrate 19 when the laser processing step S20 is being executed. In the laser processing step S20, first, the substrate 19 is placed on the chuck table 26. Thereafter, the substrate 19 is sucked and held by the chuck table 26. Here, there is no particular limitation on the orientation of the substrate 19. In FIG. 4, a sectional view schematically illustrating the substrate 19 in which a front surface 19*a* is oriented upward and a back surface 19*b* is oriented downward is illustrated. Further, when laser processing of the substrate 19 has been executed, the substrate 19 becomes the holding jig 11, and the front surface 19*a* becomes the first surface 13 while the back surface 19*b* becomes the second surface 15. However, the orientation of the substrate 19 is not limited thereto. Originally, there is no structural difference between the front surface 19*a* and the back surface 19*b* of the substrate 19 in some cases, and they are not discriminated from each other in some cases. A protective tape or the like for protecting the substrate 19 may be stuck to the side of the back surface 19*b* of the substrate 19 in advance. This protective tape may be disposed on the substrate 19 with a diameter larger than that of the substrate 19, and an outer circumferential part of the protective tape may be stuck to a ring frame. In this case, the ring frame is fixed by the clamp units 26*b* of the chuck table 26. In the sectional view illustrated in FIG. 4, the protective tape stuck to the back surface 19*b*, the ring frame, and so forth are omitted.

In the laser processing step S20, next, the laser beam irradiation unit 42 and the chuck table 26 are raised and lowered relative to each other along the Z-axis direction. As a result, the height of a focal point 52*b* that is the focal point of a laser beam 52*a* with which the substrate 19 is irradiated from the irradiation head 52 is adjusted. The height of the focal point 52*b* will be described later. Next, the focal point 52*b* and the substrate 19 are moved relative to each other along the front surface 19*a* (to become the first surface 13 later) by the irradiation head 52 of the laser beam irradiation unit 42 and the chuck table 26 being moved relative to each other along a horizontal plane including the X-axis direction and the Y-axis direction. That is, processing feed is started. Then, the laser beam irradiation unit 42 is actuated while the focal point 52*b* and the substrate 19 are moved relative to each other, and the substrate 19 is irradiated with the laser beam 52*a* with such a wavelength as to be transmitted through the substrate 19 from the side of the front surface 19*a*.

Here, a specific example of the irradiation condition of the laser beam 52*a* in the laser processing step S20 is as follows. However, the irradiation condition is not limited thereto.

Wavelength: 1342 nm
Pulse width: 150 nm
Pulse pitch: 5.2 μm
Repetition frequency: 90 kHz
Output power: combination of 1.9 W and 1.0 W
Feed rate: 465 mm/second When the laser beam 52*a* with such a wavelength as to be transmitted through the substrate 19 is focused on the focal point 52*b* inside the substrate 19, the laser beam 52*a* is absorbed by the substrate 19, and the substrate 19 is altered in the vicinity of the focal point 52*b*, so that the altered layer 17 is formed.

The laser beam 52*a* may be focused on the respective places in the substrate 19 over a plurality of times of irradiation while the height of the focal point 52*b* is changed. For example, the substrate 19 is irradiated with the laser beam 52*a* with the focal point 52*b* positioned to a height position close to the back surface 19*b* inside the substrate 19 in the first round of scanning, and the focal point 52*b* is brought closer to the front surface 19*a* every time the next round of scanning is executed. This forms the altered layer 17 continuous from the front surface 19*a* of the substrate 19 to the back surface 19*b* in the substrate 19. Alternatively, when the laser beam 52*a* is focused on the respective places in the substrate 19 over a plurality of times of irradiation while the height of the focal point 52*b* is changed, an altered region is formed in the vicinity of each of the respective focal points 52*b*. That is, a plurality of altered regions line up in the thickness direction of the substrate 19. Further, while the laser processing of the substrate 19 is executed or after the laser processing is executed, a crack is formed between the altered regions vertically adjacent to each other, and the respective altered regions are connected. Here, this crack may be formed through application of a physical shock, pressure, or the like to the substrate 19 or may be formed through the laser processing of the substrate 19.

In the case of irradiating the substrate 19 with the laser beam 52*a* two or more times with a change in the height position of the focal point 52*b*, when bringing the focal point 52*b* closer to the side of the back surface 19*b* from the side of the front surface 19*a* in a stepwise manner is attempted, the altered layer 17 with predetermined quality is sometimes not formed in the substrate 19. This is because the laser beam 52*a* is focused on the focal point 52*b* through a part altered by the preceding laser beam 52*a* (altered region). This altered part disturbs the laser beam 52*a*.

Here, it is also possible to form, in the substrate 19, the altered layer 17 that reaches the back surface 19*b* of the substrate 19 from the front surface 19*a*, by one time of scanning depending on the thickness of the substrate 19 and the irradiation condition of the laser beam 52*a*. In this case, it is preferable for the focal point 52*b* to be positioned to a height position with which the distance between the front surface 19*a* of the substrate 19 and the back surface 19*b* becomes substantially equal. Further, the focal point 52*b* may be a linear region that extends in the thickness direction of the substrate 19. In addition, the collecting lens included in the irradiation head 52 may have a function of focusing the laser beam 52*a* on the linear region.

In FIG. 4, the altered layer 17 formed in the substrate 19 is schematically illustrated as columnar regions. However, the shape of the altered layer 17 is not limited to the simple columnar shape. The thickness of the altered layer 17 may change depending on the height and may be a region that meanders, for example, from the front surface 19*a* to the back surface 19*b*.

The altered layer 17 is a part in which the material of the substrate 19 has been altered by the laser beam 52*a* (altered region), for example. The altered region refers to a part that has received a thermal influence caused by the laser beam 52*a* and been embrittled, a part different from the surroundings in density, or the like. Further, for example, when the substrate 19 is composed of a crystalline material, the altered region refers to a part made to be polycrystallized through disordering of the crystallinity thereof or a part made amorphous. The altered layer 17 is configured by this altered region but is not limited thereto.

In short, the altered layer 17 refers to a part that is included in the substrate and in which the structure has changed. The altered layer 17 includes an infinite number of cracks that are attributed to this change in the structure and have an extremely small width. Connection is made from the front surface 19*a* of the substrate 19 to the back surface 19*b* by these cracks, and thus the altered layer 17 functions as an air passage that penetrates the substrate 19. The width of each of the cracks is approximately 1 to 2 μm. However, the width of the crack is not limited thereto. When the air passage vertically continuous has been formed in the substrate 19, the holding jig 11 is manufactured.

Further, although the altered layer 17 may be configured by the altered region continuous from the front surface 19*a* to the back surface 19*b*, the altered regions that are not continuous from the front surface 19*a* to the back surface 19*b* may configure the altered layer 17. In this case, the respective altered regions are coupled by the crack. In addition, the altered regions located at both ends of the plurality of altered regions that line up and the front surface 19*a* or the back surface 19*b* of the substrate 19 are coupled by the crack. That is, the altered layer 17 includes what is configured by the altered regions that are not continuous with each other and the cracks that couple the altered regions. When description is made from another point of view, the altered layer 17 may be configured by the crack continuous from the front surface 19*a* of the substrate 19 to the back surface 19*b* and a plurality of altered regions disposed along this crack. Hereinafter, the altered layer 17 is illustrated as regions with a simple columnar shape in the respective diagrams.

However, it is preferable that the altered layer 17 not be connected to the outer circumferential surface of the substrate 19. If the altered layer 17 continuous from one end of the substrate 19 to the other end is formed in the substrate 19, the substrate 19 is split into two pieces with the altered layer 17 being the boundary. Moreover, if the altered layer 17 reaches the outer circumferential surface of the substrate 19, when the holding jig 11 formed from the substrate 19 is placed on the chuck table of the grinding apparatus and a workpiece is sucked and held with the interposition of the holding jig 11, a negative pressure leaks from the outer circumferential surface 23 of the holding jig 11.

Here, in the case of manufacturing the holding jig 11*a* as the one illustrated in FIG. 1A, processing feed of the irradiation head 52 of the laser beam irradiation unit 42 and the chuck table 26 is executed in a straight line manner. After the altered layer 17*a* is formed in the substrate 19 along one straight line, indexing feed is executed through moving the irradiation head 52 and the chuck table 26 relative to each other along the direction perpendicular to the processing feed direction. Thereafter, processing feed of the irradiation head 52 and so forth is executed along the processing feed direction again to form the altered layer 17*a* in the substrate 19 along the next straight line. In the case of forming the altered layer 17*a* including a plurality of straight line-shaped parts in the substrate 19 to manufacture the holding jig 11*a* illustrated in FIG. 1A, it is preferable that the amount of indexing feed be set to approximately 10 μm. That is, it is preferable to execute the laser processing of the substrate 19 in such a manner that the distance between the straight line-shaped parts adjacent to each other in the altered layer 17*a* is approximately 10 μm. However, this distance is not limited to 10 μm.

Further, in the case of forming the altered layer 17*b* including a plurality of circular parts in the substrate 19 to manufacture the holding jig 11*b* as the one illustrated in FIG. 1B, the plurality of circular parts are formed in the substrate 19 in such a manner that the center of each of them overlaps with the center of the front surface 19*a* of the substrate 19 and the back surface 19*b*. In this case, it is preferable to set the interval between two circular parts adjacent to each other in the radial direction to approximately 20 μm. However, the interval between the respective circular parts is not limited to 20 μm.

According to the manufacturing method of a holding jig described above, the holding jig 11 in which the altered layer 17 that functions as an air passage is formed from the first surface 13 to the second surface 15 is formed. Next, a use method of the holding jig 11 according to the present embodiment will be described. That is, a grinding method in which a workpiece is ground with use of the holding jig 11 will be described.

Figure 7:
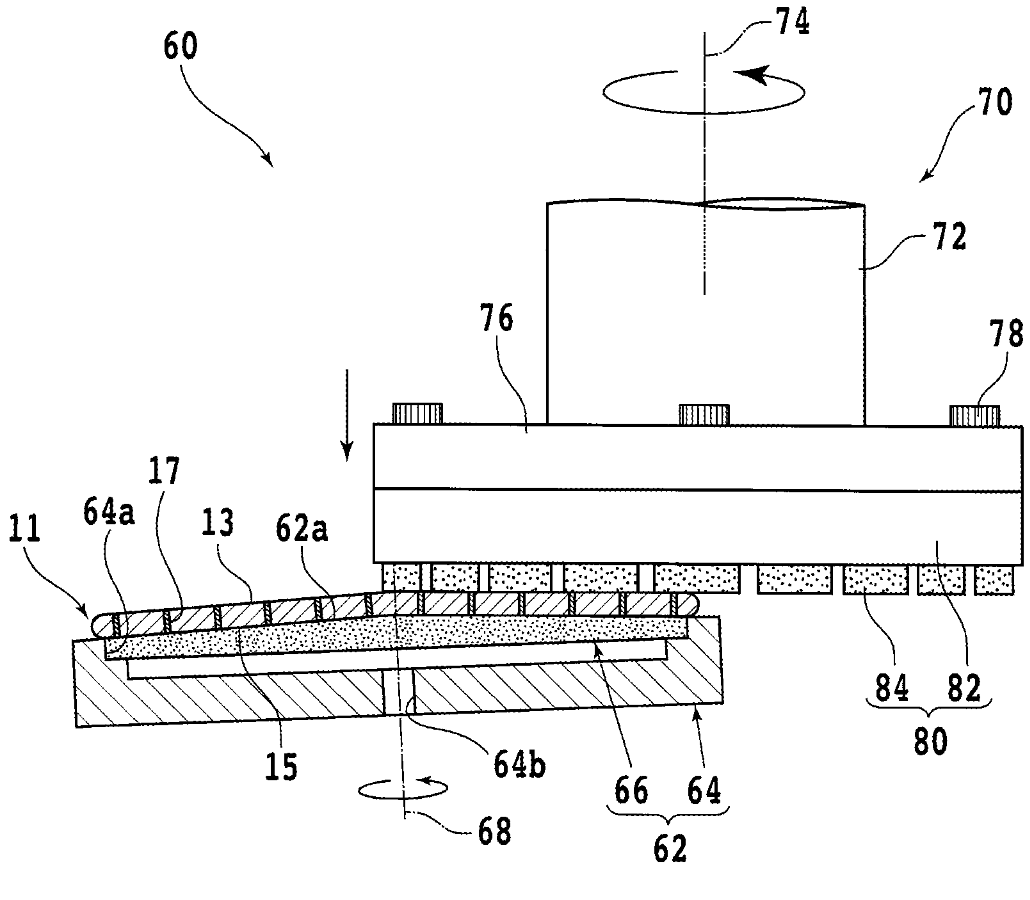
FIG. 7 is a sectional view schematically illustrating the state in which the holding jig is ground.

First, a grinding apparatus in which the holding jig 11 is used and grinding of a workpiece is executed will be described. Perspective views schematically illustrating the configuration of part of the grinding apparatus 60 are illustrated in FIG. 6 and so forth. Sectional views schematically illustrating the configuration of part of the grinding apparatus 60 are illustrated in FIG. 7 and so forth.

The grinding apparatus 60 has the chuck table 62 with a circular plate shape. The chuck table 62 has a circular plate-shaped frame body 64 formed of non-porous ceramic. A recessed part 64*a* with a circular plate shape is formed at a central part of the frame body 64. A circular plate-shaped porous plate 66 formed of ceramic is fixed to the recessed part 64*a*. A suction path 64*b* is formed in the frame body 64. A negative pressure is transmitted from a suction source (not illustrated) such as an ejector to the upper surface of the porous plate 66 through the suction path 64*b*.

The upper surface of the porous plate 66 has a circular cone shape in which a central part slightly protrudes compared with an outer circumferential part. This shape is illustrated in an emphasized manner in the sectional views illustrated in FIG. 7 and so forth. The shape of the porous plate 66 is not limited to the ones depicted in the sectional views illustrated in FIG. 7 and so forth. The circular upper surface of the porous plate 66 and the annular upper surface of the frame body 64 are substantially flush with each other and function as a substantially flat holding surface 62*a* for sucking and holding the workpiece.

A circular annular, flat plate-shaped table base (not illustrated) that supports the chuck table 62 in a rotatable manner is disposed on a lower part of the chuck table 62. Further, a tilt adjustment mechanism (not illustrated) that adjusts the tilt of the chuck table 62 is disposed on a lower part of the table base. Moreover, a spindle that configures a table rotation axis 68 is coupled to the lower part of the chuck table 62. A rotational drive source (not illustrated) such as a motor is coupled to the spindle through a pulley, a belt, and so forth. When the rotational drive source is operated, the chuck table 62 rotates around the table rotation axis 68.

The grinding unit 70 is disposed over the chuck table 62. The grinding unit 70 has a circular cylindrical spindle housing (not illustrated) having a longitudinal part disposed substantially in parallel to the vertical direction. A processing feed mechanism (not illustrated) of a ball screw system that moves the grinding unit 70 along a predetermined direction (for example, vertical direction) is coupled to the spindle housing. Further, part of a circular columnar spindle 72 is rotatably housed in the spindle housing. A rotational drive source such as a motor is disposed at an upper end part of the spindle 72. A mount 76 with a circular plate shape is fixed to a lower end part of the spindle 72 by fixing parts 78 such as bolts. The grinding wheel 80 with a circular annular shape is mounted on the lower surface side of the mount 76.

The grinding wheel 80 has a base 82 formed of an aluminum alloy. The upper surface side of the base 82 is disposed in such a manner as to come into contact with the mount 76. On the lower surface side of the base 82, a plurality of grinding abrasive stones 84 are disposed at substantially equal intervals along the circumferential direction of the base 82. Each grinding abrasive stone 84 has a bond of metal, ceramic, resin, or the like and abrasive grains of diamond, cubic boron nitride (cBN), or the like, for example. The abrasive grains with a relatively large average grain size are used for rough grinding abrasive stones, and the abrasive grains with a relatively small average grain size are used for finish grinding abrasive stones. When the spindle 72 is rotated, a circular annular grinding surface is formed by the loci of the lower surfaces of the plurality of grinding abrasive stones 84. The grinding surface is a plane orthogonal to the longitudinal direction of the spindle 72.

Figure 11B:
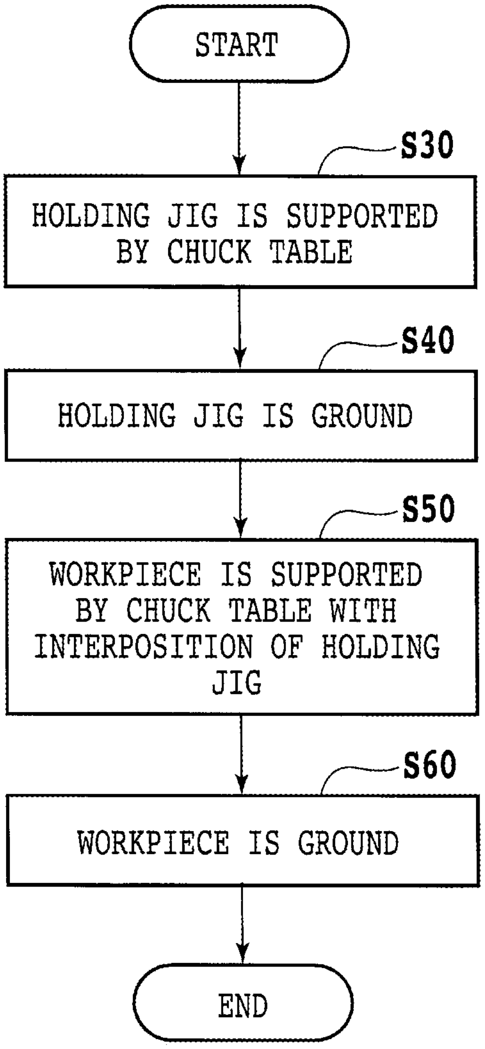
FIG. 11B is a flowchart illustrating the flow of the respective steps of a grinding method of a workpiece in which the holding jig is used.

Next, the respective steps of the grinding method of a workpiece according to the present embodiment will be described in detail. FIG. 11B is a flowchart illustrating the flow of the respective steps of the grinding method of a workpiece according to the present embodiment.

Figure 5:
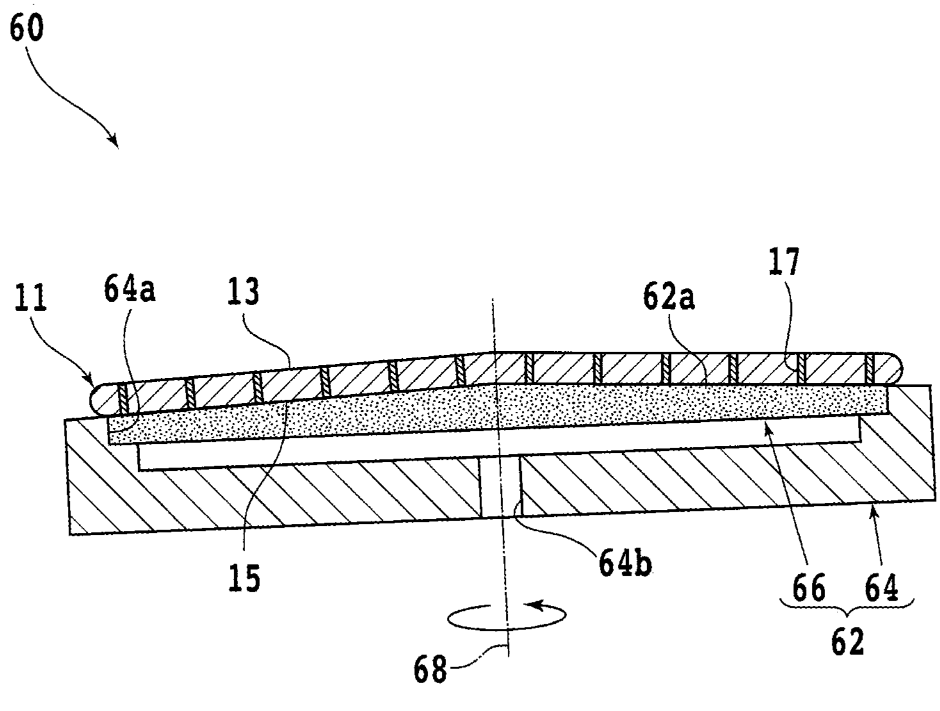
FIG. 5 is a sectional view schematically illustrating the holding jig supported by a chuck table.

First, a jig support step S30 of supporting the holding jig 11 by the chuck table 62 is executed. FIG. 5 is a sectional view schematically illustrating the jig support step S30. In the jig support step S30, the holding jig 11 is placed on the holding surface 62*a* of the chuck table 62. The surface that comes into contact with the chuck table 62 in the holding jig 11 at this time is deemed as the second surface 15. In addition, the surface on the opposite side of the second surface 15 is deemed as the first surface 13. In the jig support step S30, the holding jig 11 is supported by the chuck table 62 by the side of the second surface 15 being brought into contact with the chuck table 62. Then, the suction source of the chuck table 62 is actuated, and the holding jig 11 is sucked and held by the chuck table 62 with the interposition of the porous plate 66.

Thereafter, before the workpiece is placed on the holding jig 11, the holding jig 11 is ground by the grinding wheel 80 from the side of the first surface 13. That is, it is preferable to execute a jig grinding step S40 of grinding the holding jig 11 by the grinding wheel 80 after the jig support step S30 but before a workpiece holding step S50 to be described next.

In the jig grinding step S40, first, the table base is tilted to cause part of the holding surface 62*a* of the chuck table 62 to become substantially parallel to the grinding surface (lower surfaces of the grinding abrasive stones 84) of the grinding wheel 80. In this state, the chuck table 62 is rotated around the table rotation axis 68 at a predetermined rotation speed (for example, 200 rpm), and the grinding wheel 80 is rotated around a wheel rotation axis 74 at a predetermined rotation speed (for example, 3000 rpm). Moreover, while a grinding liquid such as purified water is supplied from a grinding liquid supply nozzle (not illustrated) of the grinding apparatus 60 to the contact region between the grinding surface and the first surface 13 of the holding jig 11, the grinding unit 70 is moved downward (that is, processing fed) at a predetermined processing feed rate (for example, 1.0 μm/s). The grinding surface of the grinding abrasive stones 84 comes into contact with the first surface 13 of the holding jig 11, and as a result, the side of the first surface 13 of the holding jig 11 is ground.

When the holding jig 11 is ground before the workpiece is placed on the holding jig 11, the shape of the ground surface (first surface 13) of the holding jig 11 becomes substantially equal to the shape of the ground surface of the workpiece that has been ground in the case in which the workpiece is directly held by the chuck table 62 and is ground under the same condition. The workpiece is brought into close contact with the ground surface (first surface 13) of the holding jig 11 that has been ground, and the workpiece is ground while being held by the chuck table 62 with the interposition of the holding jig 11. At this time, the shape of the ground surface of the workpiece that has been ground can be made substantially equal to the shape of the surface on the opposite side of the ground surface (surface brought into close contact with the ground surface of the holding jig 11). As described above, when the first surface 13 of the holding jig 11 is ground before the workpiece is placed thereon, the distance between the ground surface of the workpiece and the surface on the opposite side of the ground surface can be made substantially constant in the whole of the workpiece. That is, the thickness of the workpiece can be made substantially constant in the whole of the workpiece.

In the case in which the altered layer 17 includes a plurality of altered regions that line up along the thickness direction of the holding jig 11, the cracks that couple the first surface 13, the respective altered regions, and the second surface 15 do not need to be formed in the holding jig 11 at the timing when the jig grinding step S40 is started. In this case, the altered layer 17 may be completed through formation of the cracks that make connection from the first surface 13 to the second surface 15 in the holding jig 11 by a force applied from the grinding wheel 80 to the holding jig 11 when the holding jig 11 is ground in the jig grinding step S40.

Figure 8:
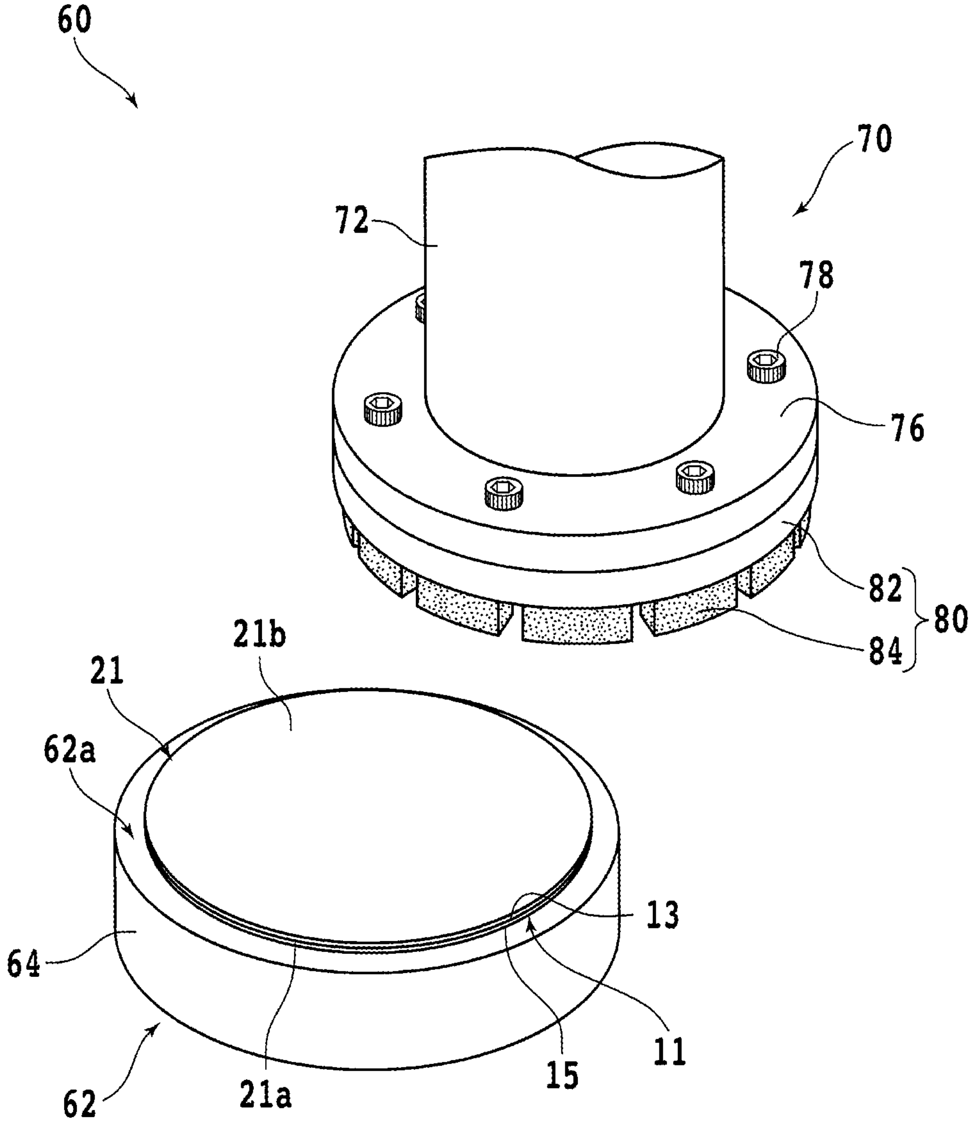
FIG. 8 is a perspective view schematically illustrating a workpiece sucked and held by the chuck table with the interposition of the holding jig.

Next, the workpiece holding step S50 of sucking and holding the workpiece by the chuck table 62 is executed. FIG. 8 is a perspective view schematically illustrating the state in which a workpiece 21 is placed on the holding jig 11 that has been ground. A plurality of devices such as integrated circuits (ICs) and large-scale integration (LSI) circuits are disposed on the side of a front surface 21*a* of the workpiece 21. Hence, the workpiece 21 is ground from the side of a back surface 21*b* to be thinned. Accordingly, in the workpiece holding step S50, in order to expose the back surface 21*b*, which is the surface to be ground in the workpiece 21, upward, the workpiece 21 is placed on the holding jig 11 in the state in which the front surface 21*a* that is the surface on the opposite side of the surface to be ground is oriented downward. That is, the first surface 13 of the holding jig 11 faces the front surface 21*a* of the workpiece 21 at this time.

In the workpiece holding step S50, after the workpiece 21 is placed on the first surface 13 of the holding jig 11, the suction source of the chuck table 62 is actuated to suck the workpiece 21 by the chuck table 62 through the holding jig 11. When the suction source of the chuck table 62 is actuated, a negative pressure acts on the workpiece 21 through the suction path 64*b*, the porous plate 66, and the altered layer 17 of the holding jig 11. That is, the workpiece 21 is sucked and held by the chuck table 62 with the interposition of the holding jig 11. Here, the altered layer 17 formed in the holding jig 11 does not reach the outer circumferential surface 23, and thus, the negative pressure generated by the suction source of the chuck table 62 is less liable to leak. Hence, the chuck table 62 can properly execute the suction-holding of the workpiece 21 with the interposition of the holding jig 11. On the side of the front surface 21*a* of the workpiece 21, a protective tape or the like for protecting the devices and so forth formed on the front surface 21*a* may be disposed. In this case, the workpiece 21 is placed over the holding jig 11 with the interposition of the protective tape.

Figure 9:
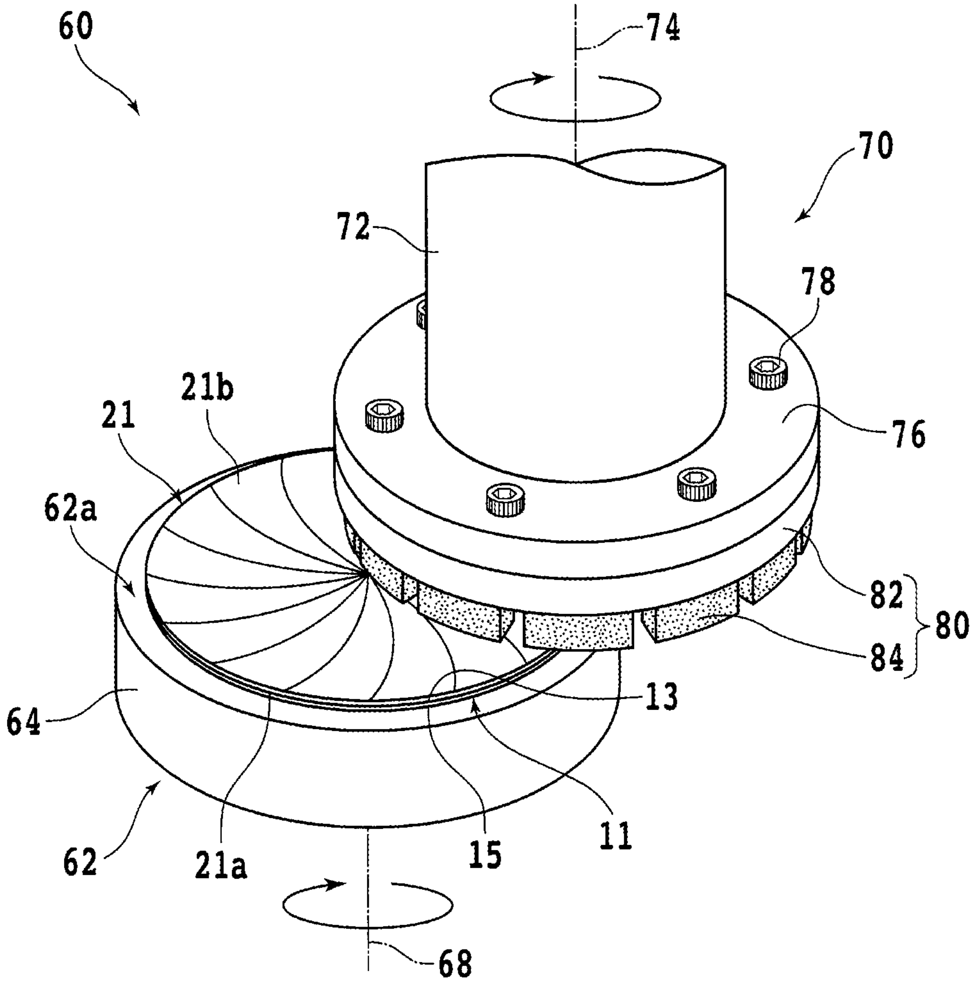
FIG. 9 is a perspective view schematically illustrating the state in which the workpiece is ground.
Figure 10:
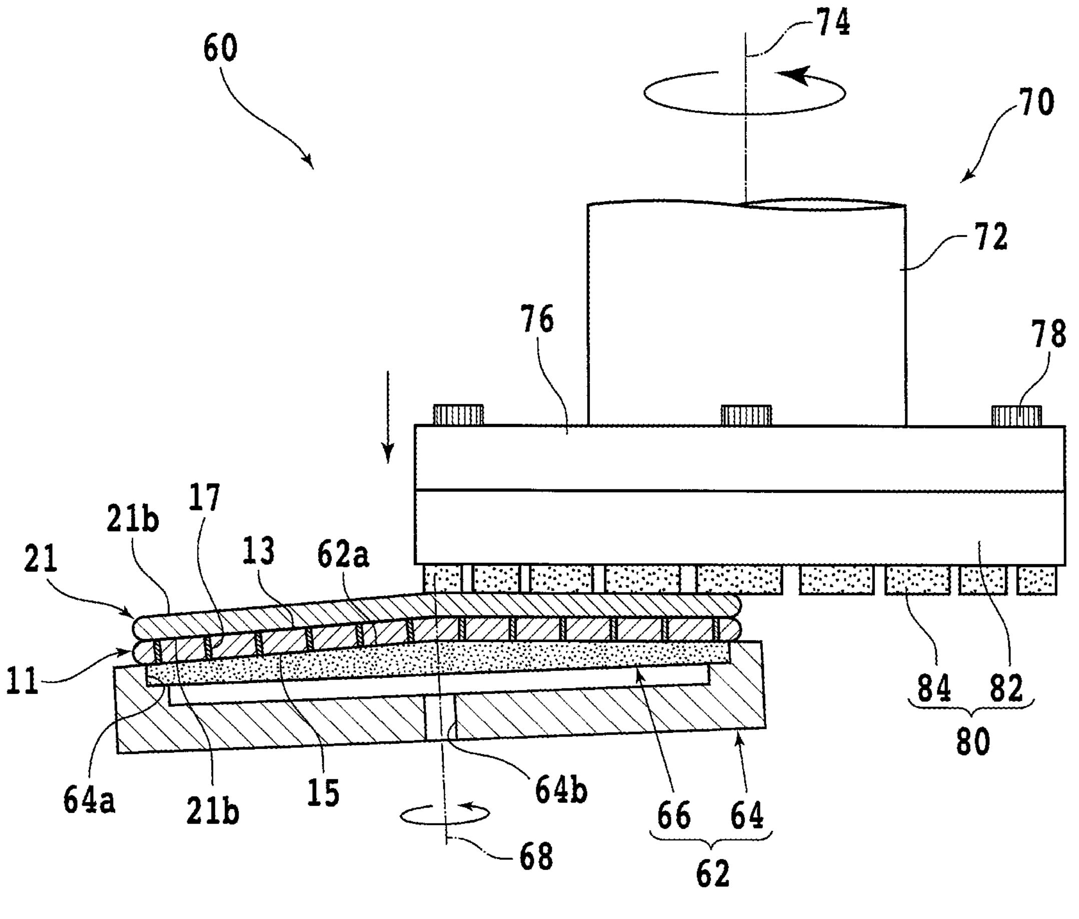
FIG. 10 is a sectional view schematically illustrating the state in which the workpiece is ground.

Next, a workpiece grinding step S60 of grinding the workpiece 21 by the grinding wheel 80 of the grinding apparatus 60 is executed. FIG. 9 is a perspective view schematically illustrating the workpiece 21 ground. FIG. 10 is a sectional view schematically illustrating the workpiece 21 ground. In the workpiece grinding step S60, the workpiece 21 is ground in a procedure similar to that of the grinding of the holding jig 11 in the jig grinding step S40.

First, rotation of the chuck table 62 around the table rotation axis 68 and rotation of the grinding wheel 80 around the wheel rotation axis 74 are started. That is, the chuck table 62 is rotated around the table rotation axis 68 at a predetermined rotation speed (for example, 200 rpm). In addition, the grinding wheel 80 is rotated around the wheel rotation axis 74 at a predetermined rotation speed (for example, 3000 rpm). Moreover, while the grinding liquid such as purified water is supplied from the grinding liquid supply nozzle of the grinding apparatus 60 to the contact region between the grinding surface of the grinding abrasive stones 84 and the back surface 21*b* of the workpiece 21, downward movement of the grinding unit 70 at a predetermined processing feed rate (for example, 1.0 μm/s) is started. That is, grinding feed in which the chuck table 62 and the grinding unit 70 move to relatively approach each other is started by actuation of the grinding feed unit.

Then, the workpiece 21 is ground by the grinding wheel 80 by the grinding surface of the grinding abrasive stones 84 being brought into contact with the back surface 21*b* of the workpiece 21 held by the chuck table 62 with the interposition of the holding jig 11. In the workpiece grinding step S60, it is preferable to advance the grinding while measuring the thickness of the workpiece 21 by a thickness measuring instrument (not illustrated) that measures the thickness of the workpiece 21 that is ground and thinned. Further, it is preferable to end the grinding feed and stop the grinding when the workpiece 21 reaches a target finished thickness. The workpiece grinding step S60 may be executed at two stages of rough grinding and finish grinding. That is, after the rough grinding of the side of the back surface 21*b* of the workpiece 21 is executed by one grinding unit 70 (that is, rough grinding unit) having rough grinding abrasive stones as the grinding abrasive stones 84, the finish grinding of the side of the back surface 21*b* is executed by another grinding unit 70 (that is, finish grinding unit) having finish grinding abrasive stones as the grinding abrasive stones 84.

After the grinding of the workpiece 21 is completed, the grinding unit 70 is separated from the chuck table 62, and the suction source of the chuck table 62 is stopped to cancel the suction-holding of the workpiece 21 by the chuck table 62. Thereafter, when the thinned workpiece 21 is divided for each device, individual device chips are obtained.

In the grinding method of a workpiece described thus far, the workpiece 21 is sucked and held by the chuck table 62 with the interposition of the holding jig 11, and the workpiece 21 is ground. Here, when the workpiece 21 is ground, the workpiece 21 is pressed against the holding surface 62*a* of the chuck table 62 by the grinding wheel 80. With the holding jig in which grooves exposed in the first surface 13 and the second surface 15 are formed as the one used in the related art, the supported workpiece 21 is pushed into these grooves in grinding, and protruding shapes corresponding to the shapes of the grooves are formed in the front surface 21*a* of the workpiece 21. In contrast, the altered layer 17 is formed instead of the grooves in the holding jig 11 according to the present embodiment. Further, the width of the crack included in the altered layer 17 exposed in the first surface 13 and the second surface 15 of the holding jig 11 is extremely small. Thus, when the workpiece 21 held by the chuck table 62 with the interposition of the holding jig 11 is ground, the protruding shapes as those in the related art are not left on the side of the front surface 21*a* of the workpiece 21.

The present invention is not limited to the description of the above-described embodiment and can be carried out with various changes. For example, in the above-described embodiment, the case in which the holding jig 11 is placed on the porous plate 66 of the chuck table 62 and is used has been explained. However, the one aspect of the present invention is not limited thereto. That is, the holding jig 11 according to the one aspect of the present invention may be housed in the recessed part 64*a* of the frame body 64 of the chuck table 62 instead of the porous plate 66 and be used. In this case, it is preferable that a circular cone shape similar to that formed in the upper surface of the porous plate 66 be formed in the upper surface of the holding jig 11. Further, when the workpiece 21 is placed on this holding jig 11 and the workpiece 21 is sucked and held by the chuck table 62 and ground, the workpiece 21 in which the thickness is uniform in the whole of the workpiece 21 and minute protruding shapes are not left in the front surface 21*a* that is the supported surface is obtained.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A holding jig that has a plate shape and is interposed between a workpiece and a chuck table when the workpiece is held by the chuck table, the holding jig comprising:

a first surface;

a second surface on an opposite side of the first surface; and an outer circumferential surface that connects the first surface and the second surface, wherein:

an altered layer that reaches a central region of the second surface from a central region of the first surface is formed, the altered layer not reaching the outer circumferential surface, wherein the altered layer comprises altered regions coupled by cracks extending through a thickness direction of the holding jig.

2. The holding jig according to claim 1, wherein the altered layer has one of or both a part formed into a straight line shape along the first surface and a part formed into a circular shape along the first surface.

3. The holding jig according to claim 1, wherein the altered layer includes a plurality of portions having circular shapes centered on the first surface.

4. The holding jig according to claim 1, wherein the altered layer functions as an air passage transmitting negative pressure between the first surface and the second surface.

5. The holding jig according to claim 1, wherein the altered layer has both a part formed into a straight line shape along the first surface and a part formed into a circular shape along the first surface.

6. The holding jig according to claim 1, wherein the altered layer is vertically oriented along the thickness direction of the holding jig.

7. A holding jig that has a plate shape and is interposed between a workpiece with a circular plate shape and a chuck table when the workpiece is held by the chuck table in a grinding apparatus including the chuck table, a grinding unit including a grinding wheel with a circular plate shape or a circular annular shape, and a grinding feed unit that causes the chuck table and the grinding unit to relatively approach or separate from each other, the holding jig comprising:

a first surface;

a second surface on an opposite side of the first surface; and an outer circumferential surface that connects the first surface and the second surface, wherein:

an altered layer that reaches a central region of the second surface from a central region of the first surface is formed, the altered layer not reaching the outer circumferential surface, and a material of a main component of the holding jig is the same as a material of a main component of the workpiece, wherein the altered layer comprises altered regions coupled by cracks extending through a thickness direction of the holding jig.

8. The holding jig according to claim 7, wherein
the altered layer has one of or both a part formed into a straight line shape along the first surface and a part formed into a circular shape along the first surface.

9. The holding jig according to claim 7, wherein the altered layer functions as an air passage transmitting negative pressure between the first surface and the second surface.

10. The holding jig according to claim 7, wherein the altered layer has both a part formed into a straight line shape along the first surface and a part formed into a circular shape along the first surface.

11. The holding jig according to claim 7, wherein the altered layer is vertically oriented along the thickness direction of the holding jig.

12. A manufacturing method of a holding jig that has a plate shape and is interposed between a workpiece and a chuck table when the workpiece is held by the chuck table, the holding jig including a first surface, a second surface on an opposite side of the first surface, and an outer circumferential surface that connects the first surface and the second surface, an altered layer that reaches a central region of the second surface from a central region of the first surface being formed, the manufacturing method comprising:
a preparation step of preparing a substrate; and
a laser processing step of manufacturing the holding jig by focusing a laser beam having a wavelength component transmitted through the substrate on the substrate and forming the altered layer in the substrate, wherein the altered layer comprises altered regions coupled by cracks extending through a thickness direction of the substrate.

13. The manufacturing method according to claim 12, wherein the laser beam is focused at a focal point positioned inside the substrate.

14. The manufacturing method according to claim 12, wherein the altered layer is formed by irradiating the substrate multiple times while changing a depth position of a focal point of the laser beam.

15. The manufacturing method according to claim 12, wherein the laser beam has a wavelength that is transmitted through the substrate material.

16. A grinding method of a workpiece in which the workpiece is ground with use of a holding jig that has a plate shape and is interposed between a workpiece with a circular plate shape and a chuck table when the workpiece is held by the chuck table in a grinding apparatus including the chuck table, a grinding unit including a grinding wheel with a circular plate shape or a circular annular shape, and a grinding feed unit that causes the chuck table and the grinding unit to relatively approach or separate from each other, the holding jig including a first surface, a second surface on an opposite side of the first surface, and an outer circumferential surface that connects the first surface and the second surface, an altered layer that reaches a central region of the second surface from a central region of the first surface being formed, and a material of a main component of the holding jig being the same as a material of a main component of the workpiece, the grinding method comprising:
a jig support step of supporting the holding jig by the chuck table by bringing a side of the second surface of the holding jig into contact with the chuck table;
a workpiece holding step of sucking and holding the workpiece by the chuck table by placing the workpiece on the first surface of the holding jig and sucking the workpiece by the chuck table through the holding jig, wherein the workpiece is sucked and held through the altered layer formed inside the holding jig; and
a workpiece grinding step of grinding the workpiece held by the chuck table with interposition of the holding jig by the grinding wheel through starting rotation of the chuck table around a table rotation axis and rotation of the grinding wheel around a wheel rotation axis and starting grinding feed in which the chuck table and the grinding unit move to relatively approach each other by actuation of the grinding feed unit, wherein the altered layer comprises altered regions coupled by cracks extending through a thickness direction of the holding jig.

17. The grinding method of a workpiece according to claim 16, further comprising:
a jig grinding step of grinding the holding jig by the grinding wheel after the jig support step but before the workpiece holding step.

18. The grinding method according to claim 16, wherein the workpiece is sucked and held through the altered layer functioning as an air passage.

* * * * *